US012583368B2

(12) United States Patent

Mankame et al.

(10) Patent No.: US 12,583,368 B2

(45) Date of Patent: Mar. 24, 2026

(54) POSITIONING SYSTEM FOR A VEHICLE HEAD RESTRAINT

(71) Applicant: GM Global Technology Operations LLC, Detroit, MI (US)

(72) Inventors: Nilesh D. Mankame, Ann Arbor, MI (US); Dorel M. Sala, Troy, MI (US); Chin-Hsu Lin, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 18/426,765

(22) Filed: Jan. 30, 2024

(65) Prior Publication Data

US 2025/0242727 A1     Jul. 31, 2025

(51) Int. Cl.
*B60N 2/02* (2006.01)
*B60N 2/00* (2006.01)
*B60N 2/806* (2018.01)

(52) U.S. Cl.
CPC ......... *B60N 2/0268* (2023.08); *B60N 2/0028* (2023.08); *B60N 2/806* (2018.02)

(58) Field of Classification Search
None
See application file for complete search history.

(56) References Cited

U.S. PATENT DOCUMENTS

| | | |
|---|---|---|
| 6,088,640 A | 7/2000 | Breed |
| 6,331,014 B1 | 12/2001 | Breed |
| 6,746,078 B2 | 6/2004 | Breed |
| 7,448,678 B2 | 11/2008 | Browne et al. |
| 7,588,115 B2 | 9/2009 | Breed |
| 7,618,091 B2 | 11/2009 | Akaike et al. |
| 7,794,012 B2 | 9/2010 | Szablewski |
| 7,963,598 B2 | 6/2011 | Akaike et al. |
| 8,600,626 B2 | 12/2013 | Yamaguchi et al. |
| 10,315,661 B2 | 6/2019 | Delgado et al. |
| 11,541,794 B1 * | 1/2023 | Muralidharan ....... B60R 21/013 |
| 12,240,473 B2 | 3/2025 | Moton, Jr. et al. |
| 2007/0257528 A1 | 11/2007 | Akaike et al. |
| 2010/0213748 A1 | 8/2010 | Pedrero Iniguez et al. |

(Continued)

FOREIGN PATENT DOCUMENTS

| | | |
|---|---|---|
| DE | 102006020532 A1 | 11/2006 |
| DE | 102009009741 B3 | 3/2010 |
| DE | 102009038374 A1 | 11/2010 |

*Primary Examiner* — Lail A Kleinman

(74) *Attorney, Agent, or Firm* — Vivacqua Crane, PLLC

(57) ABSTRACT

A positioning system for a head restraint in a vehicle includes one or more head restraint actuators, one or more proximity sensors positioned oriented to detect a fore-aft distance of a head of an occupant relative to the head restraint, and one or more controllers. The one or more controllers include one or more processors that execute instructions to determine the fore-aft position of the head restraint based on the fore-aft distance and compare the fore-aft position of the head restraint with a fore-aft bounding range of the head restraint. In response to determining the fore-aft position of the head restraint falls outside the fore-aft bounding range, the one or more controllers instruct the one or more head restraint actuators to adjust the fore-aft position of the head restraint to fall within the fore-aft bounding range. In embodiments, the positioning system includes one or more force sensors.

19 Claims, 2 Drawing Sheets

(56) References Cited

U.S. PATENT DOCUMENTS

| | | | |
|---|---|---|---|
| 2011/0233974 A1 | 9/2011 | Yamaguchi et al. | |
| 2011/0316318 A1* | 12/2011 | Yamaguchi | B60N 2/865 |
| | | | 297/391 |
| 2012/0032487 A1 | 2/2012 | Yamaguchi et al. | |
| 2017/0066353 A1 | 3/2017 | Ranjan et al. | |
| 2018/0057012 A1* | 3/2018 | Delgado | E05F 15/695 |
| 2019/0359204 A1 | 11/2019 | Saito et al. | |
| 2019/0380621 A1 | 12/2019 | Ando | |
| 2020/0139853 A1 | 5/2020 | Nawrocki et al. | |
| 2021/0170928 A1 | 6/2021 | Hong et al. | |
| 2022/0371605 A1* | 11/2022 | Moton, Jr. | B60W 50/0098 |
| 2024/0083308 A1 | 3/2024 | Kume et al. | |
| 2024/0308402 A1 | 9/2024 | Amodeo et al. | |
| 2025/0187558 A1 | 6/2025 | Rehfeld et al. | |
| 2025/0242727 A1 | 7/2025 | Mankame et al. | |

* cited by examiner

POSITIONING SYSTEM FOR A VEHICLE HEAD RESTRAINT

INTRODUCTION

The present disclosure relates to a positioning system for a head restraint in a vehicle that continually monitors a fore-aft distance measured by one or more proximity sensors, a generalized contact force between an occupant's head and the head restraint detected by one or more force sensors, or both the fore-aft distance and the generalized contact force. The positioning system continually adjusts a fore-aft position of the head restraint based on at least one of the fore-aft distance and the generalized contact force.

A head restraint for a seat in a vehicle is provided to limit rearward movement of an occupant's head relative to his or her torso during a sudden acceleration or deceleration event. It is to be appreciated that the occupant may adjust the position of a head restraint in a variety of directions such as, for example, the fore-aft direction and the vertical direction. When the head restraint is positioned at its default fore-aft position the backset distance, which is measured between the back of the occupant's head and the front surface of the head restraint, is as small as possible to minimize head and neck travel and rotation of the occupant's head during a sudden acceleration or deceleration event.

Placing the head restraint in its correct position, and especially its correct fore-aft position, may create discomfort in some occupants. Specifically, positioning the head restraint in its correct fore-aft position tends to position the head of some occupants in a forward and downward direction, which may result in neck fatigue over an extended period of time. For example, female occupants who are relatively small in stature, occupants who have neck injuries, or individuals who wear certain hairstyles that interfere with the head restraint, such as ponytails, may have their head pushed in the forward and downward direction when their head restraint is in its correct position. Accordingly, these occupants may deviate from the correct position of their head restraint by adjusting the head restraint in an effort to improve their comfort.

Thus, while current head restraints for vehicle seats achieve their intended purpose, there is a need in the art for an improved approach for adjusting the position of the head restraint to enhance occupant comfort while also ensuring the head restraint is in its correct position.

SUMMARY

According to several aspects, a positioning system for a head restraint in a vehicle is disclosed. The positioning system includes one or more head restraint actuators, where the head restraint is moveable relative to a seat by the one or more head restraint actuators. The positioning system also includes one or more proximity sensors positioned oriented to detect a fore-aft distance of a head of an occupant relative to the head restraint. The positioning system also includes one or more controllers in electronic communication with the one or more head restraint actuators and the one or more proximity sensors. The one or more controllers include one or more processors that execute instructions to continually monitor the one or more proximity sensors for the fore-aft distance. The one or more controllers determine a fore-aft position of the head restraint based on the fore-aft distance. The one or more controllers compare the fore-aft position of the head restraint with a fore-aft bounding range of the head restraint, where the fore-aft bounding range is defined relative to a position of the head of the occupant. In response to determining the fore-aft position of the head restraint falls outside the fore-aft bounding range, the one or more controllers instruct the one or more head restraint actuators to adjust the fore-aft position of the head restraint to fall within the fore-aft bounding range.

In another aspect, a length of the fore-aft bounding range extends between a lower bounding value and an upper bounding value of the fore-aft position of the head restraint.

In yet another aspect, the lower bounding value and the upper bounding value of the fore-aft position of the head restraint are defined relative to a prominent feature of the head of the occupant.

In an aspect, the prominent feature is the back of the head of the occupant.

In another aspect, the one or processors of the one or more controllers adjust the lower bounding value of the fore-aft position of the head restraint by executing a minimum value function that selects either a user preference parameter or a corrected upper bounding value and set a minimum value determined by the minimum value function as the lower bounding value of the fore-aft position.

In yet another aspect, the minimum value function is expressed as:

$$\Delta_{min} = \min\{\Delta_p, \alpha\Delta_{max}\}$$

where $\Delta_{min}$ represents the lower bounding value of the fore-aft position of the head restraint, $\Delta_p$ represents the user preference parameter, and $\alpha\Delta_{max}$ represents the corrected upper bounding value.

In an aspect, $\alpha$ represents a multiplier that ranges in value from 0 to 1 and is selected to limit the lower bounding value in the event the occupant selects a value for the user preference parameter that exceeds the upper bounding value of the fore-aft position.

In another aspect, the upper bounding value is dynamically updated based on a plurality of head restraint positioning factors.

In yet another aspect, the positioning system further comprises one or more force sensors in electronic communication with the one or more controllers.

In an aspect, the one or more force sensors are positioned to detect a generalized contact force between the back of the head of the occupant and a front surface of the head restraint.

In another aspect, the one or processors of the one or more controllers execute instructions to continually monitor the one or more force sensors for the generalized contact force, compare the generalized contact force with a maximum contact force, where the generalized contact force and the maximum contact force both include one or more force components. In response to determining the one or more force components of the generalized contact force is greater than the corresponding force components of the maximum contact force, the one or more controllers instruct the one or more head restraint actuators to adjust the fore-aft position of the head restraint in the aft direction until the generalized contact force is equal to or less than the maximum contact force or the fore-aft position of the head restraint falls within the fore-aft bounding range, whichever happens first.

In another aspect, the maximum contact force is a default value that is determined based on a population average across a representative slice of a customer base of the vehicle.

In yet another aspect, a positioning system for a head restraint in a vehicle is disclosed. The positioning system includes one or more head restraint actuators, wherein the head restraint is moveable relative to a seat by the one or more head restraint actuators. The positioning system also includes one or more force sensors positioned to detect a generalized contact force between the back of the head of an occupant and a front surface of the head restraint, and one or more controllers in electronic communication with the one or more head restraint actuators and the one or more force sensors. The one or more controllers include one or more processors that execute instructions to continually monitor the one or more force sensors for the generalized contact force. The one or more controllers compare the generalized contact force with a maximum contact force, wherein the generalized contact force and the maximum contact force both include one or more force components. In response to determining the one or more force components of the generalized contact force is greater than the corresponding force components of the maximum contact force, the one or more controllers instruct the one or more head restraint actuators to adjust a fore-aft position of the head restraint in the aft direction until the generalized contact force is equal to or less than the maximum contact force or the fore-aft position of the head restraint falls within a fore-aft bounding range of the head restraint whichever happens first, where the fore-aft bounding range of the head restraint is defined relative to a position of the head of the occupant.

In another aspect, the maximum contact force is a default value that is determined based on a population average across a representative slice of a customer base of the vehicle.

In yet another aspect, a positioning system for a head restraint in a vehicle is disclosed. The positioning system includes one or more head restraint actuators, where the head restraint is moveable relative to a seat by the one or more head restraint actuators. The positioning system also includes one or more proximity sensors positioned oriented to detect a fore-aft distance of a head of an occupant relative to the head restraint and one or more force sensors positioned to detect a generalized contact force between the back of the head of the occupant and a front surface of the head restraint. The positioning system includes one or more controllers in electronic communication with the one or more head restraint actuators, the one or more proximity sensors, and the one or more force sensors. The one or more controllers include one or more processors that execute instructions to continually monitor the one or more proximity sensors for the fore-aft distance. The one or more controllers determine a fore-aft position of the head restraint based on the fore-aft distance. The one or more controllers compare the fore-aft position of the head restraint with a fore-aft bounding range of the head restraint, where the fore-aft bounding range is defined relative to a position of the head of the occupant. In response to determining the fore-aft position of the head restraint falls outside the fore-aft bounding range, the one or more controllers instruct the one or more head restraint actuators to adjust the fore-aft position of the head restraint to fall within the fore-aft bounding range. The one or more controllers compare the generalized contact force with a maximum contact force, where the generalized contact force and the maximum contact force both include one or more force components. In response to determining the one or more force components of the generalized contact force is greater than the corresponding force components of the maximum contact force, the one or more controllers instruct the one or more head restraint actuators to adjust the fore-aft position of the head restraint in the aft direction until the generalized contact force is equal to or less than the maximum contact force or the fore-aft position of the head restraint falls within the fore-aft bounding range, whichever happens first.

In another aspect, a length of the fore-aft bounding range extends between a lower bounding value and an upper bounding value of the fore-aft position of the head restraint.

In yet another aspect, the lower bounding value and the upper bounding value of the fore-aft position of the head restraint are defined relative to a prominent feature of the head of the occupant.

In an aspect, the prominent feature is the back of the head of the occupant.

In another aspect, the one or processors of the one or more controllers adjust the lower bounding value of the fore-aft position of the head restraint by executing a minimum value function that selects either a user preference parameter or a corrected upper bounding value and set a minimum value determined by the minimum value function as the lower bounding value of the fore-aft position.

In yet another aspect, the minimum value function is expressed as:

$$\Delta_{min}=\min\{\Delta_p, \alpha\Delta_{max}\}$$

where $\Delta_{min}$ represents the lower bounding value of the fore-aft position of the head restraint, $\Delta_p$ represents the user preference parameter, and $\alpha\Delta_{max}$ represents the corrected upper bounding value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
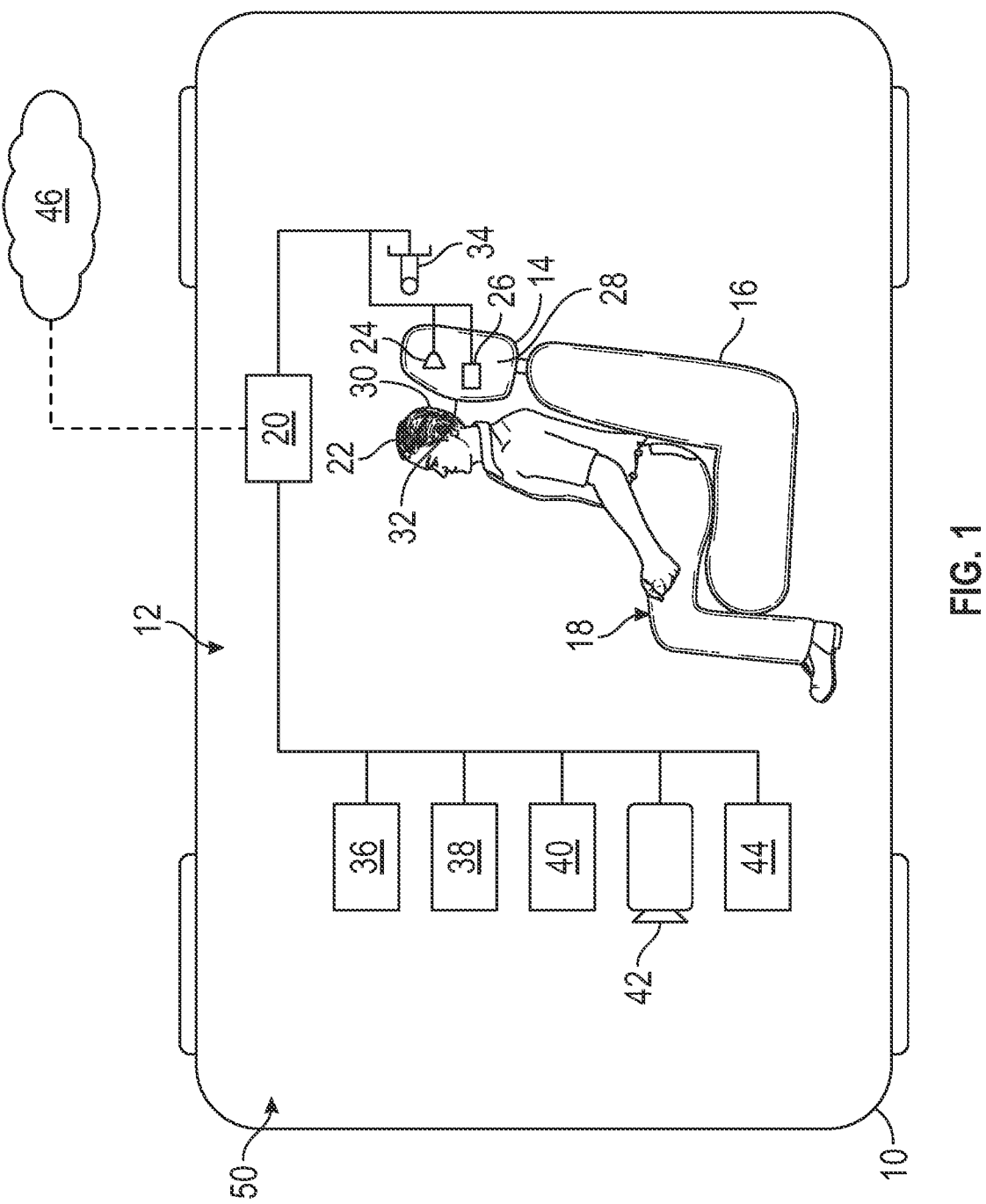
FIG. 1 illustrates a schematic diagram of a vehicle including the disclosed positioning system for a head restraint, where the positioning system includes one or more controllers in electronic communication a proximity sensor and a force sensor of the head restraint, according to an exemplary embodiment.

Referring to FIG. 1, a vehicle 10 including the disclosed positioning system 12 for a head restraint 14 that is part of a seat 16 is illustrated. As explained below, the positioning system 12 continually monitors at least one of a fore-aft distance and a generalized contact force F measured between the head 22 of an occupant 18 of the vehicle 10 and the head restraint 14. The positioning system 12 continually adjusts a fore-aft position of the head restraint 14 based on at least one of the fore-aft distance and the generalized contact force F. The positioning system 12 continually adjusts the fore-aft position of the head restraint 14 such that the head restraint 14 is positioned within a fore-aft bounding range 60 (shown in FIG. 2) defined relative to a position of the head 22 of the occupant 18.

It is to be appreciated that the vehicle 10 may be any type of vehicle such as, but not limited to, a sedan, a truck, sport utility vehicle, van, or motor home. In an embodiment, the vehicle 10 is an aircraft, marine vehicle, earth-moving machine, or train. The positioning system 12 includes one or more controllers 20. In the example as shown in FIG. 1, the one or more controllers 20 are in electronic communication with one or more proximity sensors 24 and one or more force sensors 26, however, it is to be appreciated that in embodiments the positioning system 12 may only include either proximity sensors 24 or force sensors 26 instead.

In the embodiment as shown in FIG. 1, the one or more proximity sensors 24 are located within a body 28 of the head restraint 14 and are oriented to detect a fore-aft distance of the head 22 of the occupant 18 relative to the head restraint 14. The fore-aft distance is measured between the back 30 of the head 22 of the occupant 18 and a front surface 32 of the head restraint 14. Some examples of proximity sensors that may be used include, but are not limited to, capacitive proximity sensors, infrared (IR) proximity sensors, and time-of-flight (ToF) proximity sensors.

The one or more force sensors 26 are located within the body 28 of the head restraint 14 and are positioned to detect the generalized contact force F between the back 30 of the head 22 of the occupant 18 of the vehicle 10 and the front surface 32 of the head restraint 14. It is to be appreciated that the one or more force sensors 26 are applicable in instances when the back 30 of the head 22 of the occupant 18 contacts the front surface 32 of the head restraint 14. The one or more force sensors 26 are any type of force sensor for detecting the generalized contact force F between the head 22 and the head restraint 14 such as, but not limited to, pneumatic force sensors, hydraulic force sensors, piezoelectric force sensors, capacitive force sensors, magnetostriction force sensors, and resistive force sensors. In embodiments, the one or more force sensors 26 may be multi-axial force sensors, moment sensors, or torque sensors that measure force along the x, y, and z axes (FIG. 2) as well as moments about the x, y, and z axes.

The one or more controllers 20 are also in electronic communication with one or more head restraint actuators 34, one or more vehicle dynamics controllers 36, one or more active safety systems 38, one or more occupant restraint systems 40, one or more external-facing cameras 42, and one or more vehicle sensors 44. In one non-limiting embodiment, the one or more controllers 20 are also in wireless communication with one or more vehicle networks 46. The vehicle networks 46 indicate data pertaining to external factors such as, but not limited to, traffic conditions, road conditions, weather conditions, visibility conditions, and telemetry data regarding surrounding vehicles. Some examples of weather conditions include, but are not limited to, rain, snow, or sleet. The road conditions indicate a coefficient of friction of the roadway the vehicle 10 is presently traveling along and indicate the presence of snow or ice located along the roadway. The visibility conditions are based on weather conditions such as the presence of fog, snow, and ice. The visibility conditions are also based on a time of day and indicate lighting conditions such, for example, daylight, dusk, or night. Some examples of the vehicle networks 46 include, but are not limited to, vehicle-to-vehicle (V2V) communication networks and vehicle-to-infrastructure (V2I) communication network The visibility conditions are based on weather conditions such as the presence of fog, snow, and ice. The visibility conditions are also based on a time of day and indicate lighting conditions such, for example, daylight lighting conditions, dusk lighting conditions, or nighttime lighting conditions. Some examples of the vehicle networks 46 include, but are not limited to, vehicle-to-vehicle (V2V) communication networks and vehicle-to-infrastructure (V2I) communication networks.

Continuing to refer to FIG. 1, the one or more controllers 20 receive one or more vehicle dynamics variables from the one or more vehicle dynamics controllers 36. The one or more vehicle dynamics variables are indicative of the motion of the vehicle 10 and include variables such as, but not limited to, longitudinal velocity change, rolling angle, pitch velocity, pitch angle, and brake engagement. Referring to both FIGS. 1 and 2, the one or more controllers 20 receive the fore-aft bounding range 60 (shown in FIG. 2) from the one or more vehicle dynamics controllers 36. Specifically, a fore-aft position $\Delta_f$ of the head restraint 14 is constrained between a lower bounding value $\Delta_{min}$ and an upper bounding value $\Delta_{max}$, where the upper bounding value $\Delta_{max}$ of the fore-aft position $\Delta_f$ is received by the one or more controllers 20 from the one or more vehicle dynamics controllers 36. It is to be appreciated that the upper bounding value $\Delta_{max}$ of the fore-aft position $\Delta_f$ is determined by one or more controllers located upstream of the one or more vehicle dynamics controllers 36. The one or more controllers dynamically update the upper bounding value $\Delta_{max}$ of the fore-aft position $\Delta_f$ based on a plurality of head restraint positioning factors.

The one or more active safety systems 38 include any vehicle system that prevents a collision from occurring or mitigates the effects of a collision and includes systems such as, for example, anti-lock braking (ABS) systems, electronic stability control (ESC) systems, and lane departure warning systems. The one or more active safety systems 38 send an activation signal to the one or more controllers 20 when activated. The activation signal indicates the vehicle 10 is potentially undergoing a collision, is at a risk of collision, or is deviating from a normal vehicle trajectory.

The one or more occupant restraint systems 40 are associated with either a seatbelt or an airbag corresponding to the occupant 18 located within the seat 16. In one embodiment, the occupant restraint systems 40 refer to an anchor pretensioner of a seatbelt, a load limiter of the seatbelt, and an airbag associated with an occupant 18. The one or more occupant restraint systems 40 transmit a notification when activated. Some examples of a restraint-based mechanism 30 being activated include when the anchor pretensioner is triggered, when the load limiter exceeds a corresponding threshold, or when one or more airbags are deployed. In one embodiment, the notification also indicates a stage of deployment of the airbag (e.g., a first stage deployment or a dual stage deployment).

The one or more external-facing cameras 42 capture image data representative of an environment surrounding the vehicle 10. The one or more external-facing cameras 42 may provide information regarding the current traffic conditions, the road conditions, the weather conditions, and the visibility conditions. Some examples of weather conditions include, but are not limited to, rain, snow, or sleet. The one or more additional vehicle sensors 44 include sensors such as, but not limited to, radar and LiDAR.

Figure 2:
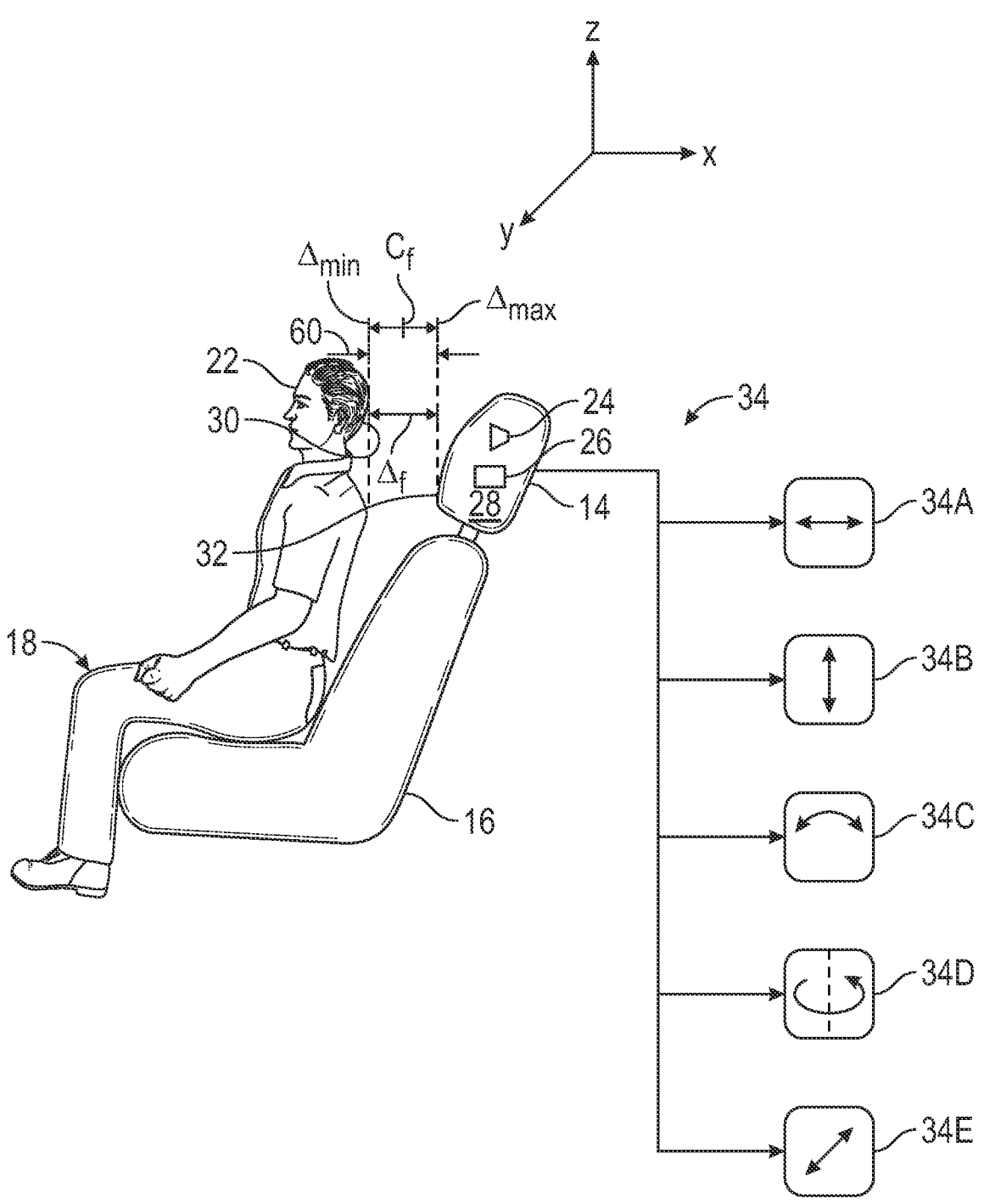
FIG. 2 is a schematic diagram illustrating the head restraint, a corresponding seat of the head restraint, the proximity sensor, the force sensor, and one or more head restraint actuators for adjusting the position of the head restraint, according to an exemplary embodiment.

FIG. 2 is a schematic diagram illustrating the head 22 of the occupant 18 relative to the head restraint 14, the seat 16, and the one or more head restraint actuators 34. Referring to both FIGS. 1 and 2, the head restraint 14 is moveable relative to the seat 16 by the one or more head restraint actuators 34. Specifically, the one or more controllers 20 instruct the one or more head restraint actuators 34 to adjust the fore-aft position $\Delta_f$ of the head restraint 14. The one or more head restraint actuators 34 include a fore-aft actuator 34A for adjusting the fore-aft position of the head restraint 14. In the non-limiting embodiment as shown in FIG. 2, the one or more head restraint actuators 34 also includes one or more additional head restraint actuators 34B, 34C, 34D, 34E. Specifically, the one or more head restraint actuators 34 include a vertical actuator 34B for adjusting a vertical position of the head restraint 14, an x-axis actuator 34C for rotating the head restraint 14 about the x-axis of the vehicle 10, a z-axis actuator 34D for rotating the head restraint 14 about the z-axis of the vehicle 10, and an x-axis actuator 34E for adjusting a side-to-side position of the head restraint 14 along the x-axis of the vehicle 10. The x-axis is aligned with the roll axis of the vehicle 10, the y-axis is aligned with the pitch axis of the vehicle 10, and the z-axis is aligned with the yaw axis of the vehicle 10. It is to be appreciated that the one or more force sensors 26 may gather multi-axial data, such as multi-axial force and torque, which may then be parsed to determine if the spatial orientation of the head restraint 14 may be changed in directions other than the fore-aft direction to accommodate occupant comfort.

The one or more controllers 20 continually adjusts the fore-aft position $\Delta_f$ of the head restraint 14 based on at least one the fore-aft distance detected by the one or more proximity sensors 24 and the generalized contact force F detected by the one or more force sensors 26. It is to be appreciated that the generalized contact force F includes multi-axial force and torque in addition to force exerted in the fore-aft direction. As seen in FIG. 2, the fore-aft position $\Delta_f$ of the head restraint 14 is constrained between the lower bounding value $\Delta_{min}$ and the upper bounding value $\Delta_{max}$, or $\Delta_{min} \leq \Delta_f \leq \Delta_{max}$, where the fore-aft position $\Delta_f$ of the head restraint 14 is measured between the back 30 of the head 22 of the occupant 18 and the front surface 32 of the head restraint 14. The length of the fore-aft bounding range 60 extends in the fore-aft direction between the lower bounding value $\Delta_{min}$ and the upper bounding value $\Delta_{max}$ of the fore-aft position $\Delta_f$.

The lower bounding value $\Delta_{min}$ and the upper bounding value $\Delta_{max}$ of the fore-aft position $\Delta_f$ are defined relative to a prominent feature of the head 22 of the occupant 18. In the non-limiting embodiment as shown in FIG. 2, the prominent feature is the back 30 of the head 22 of the occupant 18, however, other salient features of the head 22 of the occupant 18 may be used instead. It is to be appreciated that the prominent feature of the head 22 of the occupant 18 represents the datum for the fore-aft position $\Delta_f$ of the head 22 of the occupant 18. Accordingly, if another prominent feature of the head 22 is used instead, then the lower bounding value $\Delta_{min}$ and the upper bounding value $\Delta_{max}$ associated with the the fore-aft position $\Delta_f$ are adjusted accordingly. The lower bound $\Delta_{min}$ for the fore-aft position $\Delta_f$ of the head restraint 14 is dynamically updated and is determined based on occupant comfort, while the value of the upper bound $\Delta_{max}$ of the fore-aft position of the head restraint 14 is dynamically updated and represents a maximum allowable fore-aft distance of the head restraint 14 under current operating conditions of the vehicle 10.

Adjusting the lower bounding value $\Delta_{min}$ of the fore-aft position $\Delta_f$ of the head restraint 14 shall now be explained. The one or more controllers 20 determine the lower bounding value $\Delta_{min}$ of the fore-aft position $\Delta_f$ of the head restraint 14 by executing a minimum value function that selects either a user preference parameter $\Delta_p$ or a corrected upper bounding value $\alpha \Delta_{max}$. The one or more controllers 20 then set the minimum value determined by the minimum value function as the fore-aft position $\Delta_f$ of the head restraint 14. The minimum value function is expressed in Equation 1 as:

$$\Delta_{min} = \min\{\Delta_p, \alpha\Delta_{max}\} \qquad \text{Equation 1}$$

where $\alpha$ represents a multiplier that ranges in value from 0 to 1 and is described in greater detail below.

It is to be appreciated that the user preference parameter $\Delta_p$ captures a minimum offset distance, which is measured between the back 30 of the head 22 of the occupant 18 and the front surface 32 of the head restraint 14. The user preference parameter $\Delta_p$ is based on various characteristics of the occupant 18 such as, but not limited to, a personal preference of the occupant 18 regarding the fore-aft position of the head restraint 14, accommodating a hairstyle of the occupant 18, and any head and neck orthoses worn by the occupant 18. In one embodiment, a default value of the user preference parameter $\Delta_p$ may be specified based on a population average across a representative slice of a customer base of the vehicle 10. For example, the user preference parameter $\Delta_p$ may be specified based on females ranging in height from the $30^{th}$ to the $95^{th}$ percentile and males ranging in height from the $50^{th}$ to the $95^{th}$ percentile. In one embodiment, the occupant 18 may override the default value of the user preference parameter $\Delta_p$ by a bespoke setting. Merely by way of example, the bespoke setting may be determined by a fitting conducted at a point-of-sale of the vehicle 10, or by averaging values selected for the user preference parameter $\Delta_p$ over a period of time.

The multiplier a is selected to limit the upper bounding value $\Delta_{min}$ in the event the occupant 18 selects a value for the user preference parameter $\Delta_p$ that exceeds the upper bounding value $\Delta_{max}$ of the fore-aft position $\Delta_f$. That is, in other words, the multiplier a is selected to limit the lower bounding value $\Delta_{max}$ in the event the occupant 18 selects a value for the user preference parameter $\Delta_p$ that is unreasonably high. In one embodiment, the multiplier a is based on a population average across a representative slice of a customer base of the vehicle 10.

Continuing to refer to FIGS. 1 and 2, the one or more controllers 20 continually monitor the one or more proximity sensors 24 for the fore-aft distance measured between the back 30 of the head 22 of the occupant 18 and the front surface 32 of the head restraint 14. The one or more controllers 20 then determine the fore-aft position $\Delta_f$ of the head restraint 14 based on the fore-aft distance. The one or more controllers 20 compare the fore-aft position $\Delta_f$ of the head restraint 14 with the fore-aft bounding range 60. In response to determining the fore-aft position $\Delta_f$ of the head restraint 14 falls outside the fore-aft bounding range 60, the one or more controllers 20 instruct the one or more head restraint actuators 34 to adjust the fore-aft position $\Delta_f$ of the head restraint 14 to fall within the fore-aft bounding range 60. Specifically, the one or more controllers 20 instruct the fore-aft actuator 24A (FIG. 2) to adjust the fore-aft position $\Delta_f$ of the head restraint 14 to fall within the fore-aft bounding range 60.

In one non-limiting embodiment, the one or more controllers 20 instruct the fore-aft actuator 24A to adjust the fore-aft position $\Delta_f$ of the head restraint 14 to be equal to a central fore-aft position $C_f$. As seen in FIG. 2, the central fore-aft position $C_f$ represents a midpoint measured between the lower bounding value $\Delta_{min}$ and the upper bounding value $\Delta_{max}$ of the fore-aft position of the head restraint 14.

Continuing to refer to FIGS. 1 and 2, the one or more controllers 20 continually monitor the one or more force sensors 26 for the generalized contact force F between the back 30 of the head 22 of the occupant 18 of the vehicle 10 and the front surface 32 of the head restraint 14. The one or more controllers 20 compare the generalized contact force F with a maximum contact force F* as the vehicle 10 operates under normal driving conditions, where normal driving conditions indicate the vehicle 10 is not experiencing a sudden acceleration or deceleration. It is to be appreciated that the maximum contact force F* is also a generalized force that includes forces along the x, y, and z axes as well as moments about the x, y, and z axes. In other words, the generalized contact force F and the maximum contact force F* both include one or more force components. In response to determining one or more force components of the generalized contact force F are greater than the corresponding force components of the maximum contact force F*, the one or more controllers 20 instruct the fore-aft actuator 34A to adjust the fore-aft position $\Delta_f$ of the head restraint 14 in the aft direction until the generalized contact force F is equal to or less than the maximum contact force F* or the fore-aft position $\Delta_f$ of the head restraint 14 falls within the fore-aft bounding range 60, whichever happens first. That is, the one or more controllers 20 instruct the fore-aft actuator 34A to adjust the fore-aft position $\Delta_f$ of the head restraint 14 in the aft direction until whichever of the following happens first, the generalized contact force F is equal to or less than the maximum contact force F*, or the fore-aft position $\Delta_f$ of the head restraint 14 is at the upper bounding value $\Delta_{max}$. Alternatively, in response to determining a prescribed functional combination of the one or more force components of the generalized contact force F are greater than the corresponding prescribed functional combination of the one or more force components of the maximum contact force F*, the one or more controllers 20 instruct the fore-aft actuator 34A to adjust the fore-aft position $\Delta_f$ of the head restraint 14 in the aft direction until the generalized contact force F is equal to or less than the maximum contact force F* or the fore-aft position $\Delta_f$ of the head restraint 14 falls within the fore-aft bounding range 60, whichever happens first.

In one non-limiting embodiment, the maximum contact force F* is a default value that is determined based on a population average across a representative slice of a customer base of the vehicle 10. In one embodiment, the occupant 18 may override the default value of the maximum contact force F* by a bespoke setting. Merely by way of example, the bespoke setting may be determined by a fitting conducted at a point-of-sale of the vehicle 10, or by averaging values determined over a period of time.

In one embodiment, the positioning system 12 includes both the one or more proximity sensors 24 and the one or more force sensors 26. When both the proximity sensors 24 and the force sensors 26 are included, the one or more proximity sensors 24 may be used to determine the fore-aft position $\Delta_f$ when the generalized contact force F between the back 30 of the head 22 of the occupant 18 of the vehicle 10 and the front surface 32 of the head restraint 14 is unavailable (i.e., the head 22 of the occupant 18 is not resting against the head restraint 14). Similarly, when the generalized contact force F between the head 22 of the occupant 18 of the vehicle 10 and the head restraint 14 is available, the generalized contact force F indicates if the occupant 18 is gently resting his or her head 22 against the head restraint 14 versus actively resisting the fore-aft position $\Delta_f$ of the head restraint 14, which is not discernable by the proximity sensors 24. As an example, the value of the user preference parameter $\Delta_p$ may be selected based on the generalized contact force F between the back 30 of the head 22 of the occupant 18 of the vehicle 10 and the front surface 32 of the head restraint 14.

It is to be appreciated that the one or more controllers 20 continually monitor the one or more vehicle dynamics controllers 36, the one or more active safety systems 38, the one or more occupant restraint systems 40, the one or more external-facing cameras 42, and the one or more vehicle sensors 44 to assess a risk associated with the vehicle 10 deviating from a normal, controlled vehicle trajectory. Some examples of deviating from the normal, controlled vehicle trajectory include slipping on an icy road or colliding with another vehicle or object. When the risk associated with deviating from the normal, controlled vehicle trajectory exceeds a predetermined threshold value, the one or more controllers 20 instruct the one or more head restraint actuators 34 to cease continually adjusting the fore-aft position $\Delta_f$ of the head restraint 14 as described above. Instead, the one or more controllers 20 position of the head restraint 14 to minimize neck travel and rotation of the head 22 of the occupant 18 during a sudden acceleration or deceleration event. However, once the one or more controllers 20 determine the risk no longer exceeds the predetermined threshold value, then the one or more controllers 20 may resume continually adjusting the fore-aft position $\Delta_f$ of the head restraint 14 as described above. The predetermined threshold value may be adjusted based on factors such as, for example, vehicle weight and vehicle type (sedan, truck, etc.). The predetermined threshold value indicates it is more likely than not that the vehicle 10 will deviate from the normal, controlled vehicle trajectory.

As mentioned above, one or more controllers located upstream of the one or more vehicle dynamics controllers 36 dynamically update the upper bounding value $\Delta_{max}$ of the fore-aft position $\Delta_f$ based on the plurality of head restraint positioning factors. The plurality of head restraint positioning factors are indicative of the risk associated with the vehicle 10 deviating from the normal, controlled vehicle trajectory. The plurality of head restraint positioning factors include one or more of the following: a size of the vehicle 10, a type of vehicle (e.g., sedan, truck, etc.), vehicle speed, road conditions, weather conditions, traffic conditions, a height and weight of the occupant 18, a direction of a potential collision, the sensitivity of the vehicle 10 during a collision, the likelihood of collision of the vehicle 10, a collision prediction factor, and predicted head motion of the occupant 18. As the risk associated with the vehicle 10 deviating from the normal, controlled vehicle trajectory increases, the fore-aft bounding range 60 decreases in length, thereby moving the head restraint 14 progressively closer to the head 22 of the occupant 18. Similarly, as the risk associated with the vehicle 10 deviating from the normal, controlled vehicle trajectory decreases, the fore-aft bounding range 60 increases in length, and therefore the head restraint 14 may be positioned further away from the head 22 of the occupant 18.

Referring generally to the figures, the disclosed positioning system for a head restraint provides various technical effects and benefits. Specifically, the positioning system continually monitors the fore-aft distance measured by one or more proximity sensors, a generalized contact force between the occupant's head and the head restraint by one or more force sensors, or both the fore-aft distance and the generalized contact force. The positioning system adjusts the fore-aft position of the head restraint such that the head restraint is positioned within the fore-aft bounding range, where the lower bounding value of the fore-aft bounding range is based on occupant comfort preferences and the upper bounding value of the fore-aft bounding range is dynamically updated based on the plurality of head restraint positioning factors. In addition to or in the alternative, the positioning system may also adjust the generalized contact force between the head of the occupant and the head restraint based on a maximum contact force, where the maximum contact force is an occupant comfort preference parameter. It is to be appreciated that the length of the fore-aft bounding range is dynamically updated to position the head restraint progressively closer to the head of the occupant as the risk associated with the vehicle deviating from the normal, controlled vehicle trajectory increases. Similarly, as the risk associated with the vehicle deviating from the normal, controlled vehicle trajectory decreases, the length of the fore-aft bounding range is increased, thereby allowing the occupant to adjust the position of the head restraint to maximize his or her comfort.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A positioning system for a head restraint in a vehicle, the positioning system comprising:
one or more head restraint actuators, wherein the head restraint is moveable relative to a seat by the one or more head restraint actuators;
one or more proximity sensors positioned oriented to detect a fore-aft distance of a head of an occupant relative to the head restraint; and
one or more controllers in electronic communication with the one or more head restraint actuators and the one or more proximity sensors, wherein the one or more controllers include one or more processors that execute instructions to:
continually monitor the one or more proximity sensors for the fore-aft distance;
determine a fore-aft position of the head restraint based on the fore-aft distance;
compare the fore-aft position of the head restraint with a fore-aft bounding range of the head restraint, wherein the fore-aft bounding range is defined relative to a position of the head of the occupant, wherein a length of the fore-aft bounding range extends between a lower bounding value and an upper bounding value of the fore-aft position of the head restraint and the upper bounding value is dynamically updated based on a plurality of head restraint positioning factors, and wherein the plurality of head restraint positioning factors are indicative of the risk associated with the vehicle deviating from a normal, controlled vehicle trajectory; and
in response to determining the fore-aft position of the head restraint falls outside the fore-aft bounding range, instruct the one or more head restraint actuators to adjust the fore-aft position of the head restraint to fall within the fore-aft bounding range.

2. The positioning system of claim 1, wherein the lower bounding value and the upper bounding value of the fore-aft position of the head restraint are defined relative to a prominent feature of the head of the occupant.

3. The positioning system of claim 2, wherein the prominent feature is the back of the head of the occupant.

4. The positioning system of claim 1, wherein the one or processors of the one or more controllers adjust the lower bounding value of the fore-aft position of the head restraint by:
executing a minimum value function that selects either a user preference parameter or a corrected upper bounding value; and
set a minimum value determined by the minimum value function as the lower bounding value of the fore-aft position.

5. The positioning system of claim 4, wherein the minimum value function is expressed as:
$\Delta_{min} = min\{\Delta_p, \alpha\Delta_{max}\}$ $\Delta_{min}$ts the lower bounding value of the fore-aft position of the head restraint, $\Delta_p$ represents the user preference parameter, and $\alpha\Delta_{max}$ts the corrected upper bounding value.

6. The positioning system of claim 5, wherein a represents a multiplier that ranges in value from 0 to 1 and is selected to limit the lower bounding value in the event the occupant selects a value for the user preference parameter that exceeds the upper bounding value of the fore-aft position.

7. The positioning system of claim 1, further comprising one or more force sensors in electronic communication with the one or more controllers.

8. The positioning system of claim 7, wherein the one or more force sensors are positioned to detect a generalized contact force between the back of the head of the occupant and a front surface of the head restraint.

9. The positioning system of claim 8, wherein the one or processors of the one or more controllers execute instructions to:
continually monitor the one or more force sensors for the generalized contact force;
compare the generalized contact force with a maximum contact force, wherein the generalized contact force and the maximum contact force both include one or more force components; and
in response to determining the one or more force components of the generalized contact force is greater than the corresponding force components of the maximum contact force, instruct the one or more head restraint actuators to adjust the fore-aft position of the head restraint in the aft direction until the generalized contact force is equal to or less than the maximum contact force or the fore-aft position of the head restraint falls within the fore-aft bounding range, whichever happens first.

10. The positioning system of claim 9, wherein the maximum contact force is a default value that is determined based on a population average across a representative slice of a customer base of the vehicle.

11. A positioning system for a head restraint in a vehicle, the positioning system comprising:

one or more head restraint actuators, wherein the head restraint is moveable relative to a seat by the one or more head restraint actuators;

one or more force sensors positioned to detect a generalized contact force between the back of the head of an occupant and a front surface of the head restraint; and one or more controllers in electronic communication with the one or more head restraint actuators and the one or more force sensors, wherein the one or more controllers include one or more processors that execute instructions to:

continually monitor the one or more force sensors for the generalized contact force;

compare the generalized contact force with a maximum contact force, wherein the generalized contact force and the maximum contact force both include one or more force components, wherein the maximum contact force is a default value that is determined based on a population average across a representative slice of a customer base of the vehicle, and wherein the default value of the maximum contact force is overridden by a bespoke setting that is selected by a customer, and wherein the bespoke setting is determined based on settings of the occupant; and in response to determining the one or more force components of the generalized contact force is greater than the corresponding force components of the maximum contact force, instruct the one or more head restraint actuators to adjust a fore-aft position of the head restraint in the aft direction until the generalized contact force is equal to or less than the maximum contact force or the fore-aft position of the head restraint falls within a fore-aft bounding range of the head restraint, whichever happens first, and wherein the fore-aft bounding range of the head restraint is defined relative to a position of the head of the occupant.

12. A positioning system for a head restraint in a vehicle, the positioning system comprising:

one or more head restraint actuators, wherein the head restraint is moveable relative to a seat by the one or more head restraint actuators;

one or more proximity sensors positioned oriented to detect a fore-aft distance of a head of an occupant relative to the head restraint;

one or more force sensors positioned to detect a generalized contact force between the back of the head of the occupant and a front surface of the head restraint; and one or more controllers in electronic communication with the one or more head restraint actuators, the one or more proximity sensors, and the one or more force sensors, wherein the one or more controllers include one or more processors that execute instructions to:

continually monitor the one or more proximity sensors for the fore-aft distance;

determine a fore-aft position of the head restraint based on the fore-aft distance;

compare the fore-aft position of the head restraint with a fore-aft bounding range of the head restraint, wherein the fore-aft bounding range is defined relative to a position of the head of the occupant, wherein a length of the fore-aft bounding range extends between a lower bounding value and an upper bounding value of the fore-aft position of the head restraint and the upper bounding value is dynamically updated based on a plurality of head restraint positioning factors, and wherein the plurality of head restraint positioning factors are indicative of the risk associated with the vehicle deviating from a normal, controlled vehicle trajectory;

in response to determining the fore-aft position of the head restraint falls outside the fore-aft bounding range, instruct the one or more head restraint actuators to adjust the fore-aft position of the head restraint to fall within the fore-aft bounding range, wherein the maximum contact force is a default value that is determined based on a population average across a representative slice of a customer base of the vehicle, and wherein the default value of the maximum contact force is overridden by a bespoke setting that is selected by a customer, and wherein the bespoke setting is determined based on settings of the occupant;

compare the generalized contact force with a maximum contact force, wherein the generalized contact force and the maximum contact force both include one or more force components; and in response to determining the one or more force components of the generalized contact force is greater than the corresponding force components of the maximum contact force, instruct the one or more head restraint actuators to adjust the fore-aft position of the head restraint in the aft direction until the generalized contact force is equal to or less than the maximum contact force or the fore-aft position of the head restraint falls within the fore-aft bounding range, whichever happens first.

13. The positioning system of claim 12, wherein the lower bounding value and the upper bounding value of the fore-aft position of the head restraint are defined relative to a prominent feature of the head of the occupant.

14. The positioning system of claim 13, wherein the prominent feature is the back of the head of the occupant.

15. The positioning system of claim 12, wherein the one or processors of the one or more controllers adjust the lower bounding value of the fore-aft position of the head restraint by:

executing a minimum value function that selects either a user preference parameter or a corrected upper bounding value; and set a minimum value determined by the minimum value function as the lower bounding value of the fore-aft position.

16. The positioning system of claim 15, wherein the minimum value function is expressed as:

$\Delta_{min} = \{\min \Delta_p, \alpha\Delta_{max}\}$ $\Delta_{min}$ ts the lower bounding value of the fore-aft position of the head restraint, $\Delta_p$ represents the user preference parameter, and $\alpha\Delta_{max}$ ts the corrected upper bounding value.

17. The positioning system of claim 1, wherein the one or processors of the one or more controllers execute instructions to:

compare the risk associated with deviating from the normal, controlled vehicle trajectory with a predetermined threshold value;

determine the risk exceeds the predetermined threshold value; and in response to determining the risk exceeds the predetermined threshold, instruct the one or more head restraint actuators to cease continually adjusting the fore-aft position of the head restraint.

18. The positioning system of claim 1, wherein deviating from the normal, controlled vehicle trajectory includes one of the following: slipping on an icy road, colliding with another vehicle, and colliding with another object.

19. The positioning system of claim 18, wherein the predetermined threshold value is based on vehicle weight and vehicle type.

\* \* \* \* \*